(12) United States Patent
Scheidiger et al.

(10) Patent No.: US 12,023,755 B2
(45) Date of Patent: Jul. 2, 2024

(54) MACHINING APPARATUS FOR LASER MACHINING A WORKPIECE AND METHOD FOR LASER MACHINING A WORKPIECE

(71) Applicant: Bystronic Laser AG, Niederönz (CH)

(72) Inventors: Simon Scheidiger, Langenthal (CH); Andreas Luedi, Burgdorf (CH); Michael Berger, Bern (CH); Martin Mumenthaler, Rohrbach (CH)

(*) Notice: Subject to any disclaimer, the term of this patent is extended or adjusted under 35 U.S.C. 154(b) by 0 days.

(21) Appl. No.: 17/617,051

(22) PCT Filed: Jun. 5, 2020

(86) PCT No.: PCT/EP2020/065623
§ 371 (c)(1),
(2) Date: Dec. 7, 2021

(87) PCT Pub. No.: WO2020/245353
PCT Pub. Date: Dec. 10, 2020

(65) Prior Publication Data
US 2022/0266383 A1 Aug. 25, 2022

(30) Foreign Application Priority Data
Jun. 7, 2019 (EP) .................................. 19179047

(51) Int. Cl.
*B23K 26/06* (2014.01)
*B23K 26/38* (2014.01)

(52) U.S. Cl.
CPC ...... *B23K 26/0648* (2013.01); *B23K 26/0643* (2013.01); *B23K 26/38* (2013.01)

(58) Field of Classification Search
CPC . B23K 26/0648; B23K 26/0643; B23K 26/38
See application file for complete search history.

(56) References Cited

U.S. PATENT DOCUMENTS

2014/0330260 A1* 11/2014 Bergt .................. B23K 26/082
  606/5
2018/0009062 A1* 1/2018 Sbetti ..................... B23K 26/21
(Continued)

FOREIGN PATENT DOCUMENTS

DE   102008053397 A1   10/2008
DE   201410203025      2/2014
(Continued)

OTHER PUBLICATIONS

Machine Translation of DE102014203025A1.
(Continued)

*Primary Examiner* — Dana Ross
*Assistant Examiner* — Kuangyue Chen
(74) *Attorney, Agent, or Firm* — BelayIP

(57) ABSTRACT

A machining apparatus for laser machining a workpiece in a machining zone is provided, having an interface for a machining laser source for generating a machining laser beam with a direction of propagation; an outlet opening for the machining laser beam; and an optical system between the interface and the outlet opening, wherein the optical system has: at least one optical unit that adjusts the focal length of the optical system, and at least one stationary laser beam guiding device with at least one movable surface, wherein the at least one movable surface can be adjusted such that it modifies the focal length of the optical system and/or the beam parameter product of the machining laser beam integrated over time in at least one operating mode. Further provided is a method for laser machining a workpiece.

21 Claims, 4 Drawing Sheets

(56) References Cited

U.S. PATENT DOCUMENTS

| | | | | |
|---|---|---|---|---|
| 2018/0250775 A1* | 9/2018 | Spink | ............... | B23K 26/10 |
| 2019/0061054 A1* | 2/2019 | Mizuno | ............... | B25J 9/1684 |
| 2020/0156189 A1* | 5/2020 | Rataj | ............... | B23K 26/066 |
| 2020/0398373 A1* | 12/2020 | Rataj | ............... | B23K 26/0643 |
| 2022/0040795 A1* | 2/2022 | Scheidiger | ............... | B23K 26/38 |
| 2022/0143756 A1* | 5/2022 | Scheidiger | ............... | B23K 26/082 |

FOREIGN PATENT DOCUMENTS

| | | | | |
|---|---|---|---|---|
| EP | 3412400 A1 | 12/2018 | | |
| WO | WO-2018007967 A1 * | 1/2018 | ............... | B23K 26/06 |
| WO | WO2018007967 A1 | 1/2018 | | |

OTHER PUBLICATIONS

Machine Translation of DE102008053397A1.
International Search Report for Priority Document for PCT/EP2020/065623.

\* cited by examiner

MACHINING APPARATUS FOR LASER MACHINING A WORKPIECE AND METHOD FOR LASER MACHINING A WORKPIECE

CROSS REFERENCE TO RELATED APPLICATIONS

The present application is a national phase application of International Application No.: PCT/EP2020/065623, filed on Jun. 5, 2020 and further claims priority to European Patent Application EP19179047.6 filed Jun. 7, 2019, the content of both of which is hereby incorporated by reference.

FIELD OF THE INVENTION

The present disclosure relates to a machining apparatus for laser machining a workpiece, use of a machining apparatus for laser machining a workpiece and a method for laser machining a workpiece.

BACKGROUND OF THE INVENTION

Laser machining apparatuses are used in the laser machining of workpieces, in particular in methods for the thermal separation of materials by means of laser radiation, such as laser cutting. In many cases, a laser machining head is used to guide the machining laser beam onto the workpiece, for example onto a sheet to be machined. For example, in flatbed cutting systems, the workpiece is machined with a laser beam and a gas jet. The machining head is configured as a cutting head and directs the two beams to the workpiece in an optimal manner. Depending on the workpiece (material and thickness) and the desired process, a different laser beam may be optimal.

Most available cutting heads for medium laser powers of over 1 kW have an unchangeable optical image of the laser beam on the workpiece to be machined. This image represents a compromise. The beam can be used for different materials as well as for thin and thick workpieces. In contrast, a rigid optical image of the laser beam for most materials and thicknesses is accompanied by losses in cut quality and/or feed rate.

In recent years, zoom optics for laser machining have been developed and used in cutting heads. With these, the imaging ratio, i.e. the focal length of the optics, can be changed within a certain range, in particular depending on the type and thickness of the workpiece. In zoom optics, at least two optical elements can typically be set such that the position of the focus of the machining laser beam is displaced parallel to its direction of propagation.

There are approaches for laser machining in which beam shaping of the laser beam is performed. Beam shaping can be understood to mean changing the beam parameter product of the laser beam and/or changing the mixture of the electromagnetic laser modes and/or varying the transverse distribution of the power of the laser beam. There is static beam shaping, in which the beam parameter product is adjusted at one time or more singular (isolated) times, as described in EP3412400 A1. In addition, there is also dynamic beam shaping (DBS), in which the beam parameter product is changed by continuous dynamic movement of the laser beam over a period of time, in an averaged or integrated manner, for example by beam oscillation. DE102008053397 B4, for example, discloses a method for fusion cutting workpieces with laser beam, in which the inclination angle of the cutting front is permanently changed by a movement of the focal point of the laser beam superimposed on the feed movement in such a way that the incident angle of the laser beam is kept within an interval around the Brewster angle. DE 102014203025 A1 describes a method for laser beam welding using a scanner optics enabling rapid movement of the machining laser beam during the welding process in addition to the relative movement between welding head and workpiece.

In laser machining using dynamic beam shaping, the laser beam is moved across the workpiece to be machined at frequencies of, for example, 100 Hz to 10 kHz, i.e. at frequencies that are significantly higher than the typical reaction time between the laser beam and the material. The workpiece is thus machined with a power distribution of the machining laser beam averaged over time or integrated over time. By means of dynamic beam shaping, almost any power distribution and intensity distribution of the laser beam spot can be generated. Advantages of laser cutting with dynamic beam shaping have been shown by IWS, Fraunhofer, see https://www.iws.fra unhofer.de/content/dam/iws/en/documents/publications/annual report article s/2015/JB-IWS-2015-en-S86-87.pdf.

Adaptive mirrors such as those available from AOS or IOF can be used for beam shaping of laser beams. If surface areas of the mirror can be quickly adjusted independently of one another, for example with frequencies of more than 100 Hz, both static and dynamic beam shaping can be performed with such mirrors. A deformable reflecting element with a controlled surface, having a plurality of reflection areas independently movable is described, for example, in WO2018007967 A1.

SUMMARY OF THE INVENTION

The object of the invention is to provide a machining apparatus and a method for laser machining a workpiece, which provide a function of changing the focal length, in particular a zoom function, for the machining laser beam and beam shaping of the machining laser beam.

In one embodiment of the invention, a machining apparatus for laser machining a workpiece in a machining zone is provided, in particular for laser cutting, in particular a laser machining head, having an interface for a machining laser source for generating a machining laser beam with a direction of propagation;
an outlet opening for the machining laser beam; and an optical system between the interface and the outlet opening, wherein the optical system has:
at least one optical unit that adjusts the focal length of the optical system, and at least one stationary laser beam guiding device with at least one movable surface, wherein the at least one movable surface can be adjusted such that it modifies the focal length of the optical system and the beam parameter product of the machining laser beam integrated over time in at least one operating mode.

In the machining apparatus, the function of changing the focal length, for example a zoom function, and the beam shaping function can be performed with a single component due to the stationary laser beam guiding device with at least one movable surface. As a result, at least one operating mode is implemented in which the function of changing the focal length and the beam shaping function are used. For this purpose, the at least one movable surface can be adjusted in such a way that it modifies the focal length of the optical system and the beam parameter product of the machining laser beam integrated over time. In additional operating modes, either the function of changing the focal length or the beam shaping function can be used. For this purpose, the at least one movable surface can be adjusted in such a way that it modifies the focal length of the optical system, or the beam parameter product of the machining laser beam integrated over time. For further additional operating modes, the at least one movable surface can be adjusted in such a way that it does not modify the focal length, or the beam parameter product of the machining laser beam integrated over time. For this purpose, the at least one movable surface can be adjustable in such a way that the machining laser beam is only guided, for example deflected, to the outlet opening.

The beam parameter product of the machining laser beam integrated over time can be modified with the at least one movable surface. This means that if the movable surface is only spatially adjusted, the beam parameter product can be set and a static beam shaping of the machining laser beam can be carried out. If the movable surface is not only spatially but also temporally adjusted, i.e. over the course of one or more time periods, the beam parameter product can be set or varied, and dynamic beam shaping of the machining laser beam is made possible. In this way, almost any intensity distributions of the beam spot and beam parameter products of the machining laser beam can be provided. Furthermore, since the function of changing the focal length (zoom function) and the functions of static and/or dynamic beam shaping are implemented in a single component, a space-saving arrangement of the beam path of the machining laser beam can be realised. In addition, in order to provide the function of changing the focal length and the functions of static and/or dynamic beam shaping, it is not necessary to move or displace the entire laser beam guiding device. It can therefore be provided in a stationary manner in the machining apparatus. Furthermore, the machining apparatus, even if it is configured as a machining head, can be used for powers of the machining laser beam of up to 4 kW and above.

The at least one movable surface can be adjustable by means of at least one movement device. As a result, the machining laser beam is moved and/or shaped at least parallel and/or perpendicular to its direction of propagation. Furthermore, the at least one movable surface can provide a surface unit of the laser beam guiding device whose surface geometry, in particular its curvature, can be adjusted. As a result, not only can the divergence of the machining laser beam be changed and/or the focus position of the machining laser beam can be displaced parallel to its direction of propagation, but the machining laser beam can also be shaped and/or moved at least perpendicular to its direction of propagation. The at least one movable surface can also be dynamically adjustable. This enables the dynamic beam shaping of the machining laser beam.

The laser beam guiding device of the embodiments has a plurality of dynamically orientable surfaces. Alternatively, the laser beam guiding device has a continuous surface that is dynamically deformable.

The at least one movable surface can be at least partially reflective for the machining laser beam and/or can be arranged in the machining apparatus such that the machining laser beam is deflected. In one embodiment, the laser beam guiding device can have at least one segment mirror with a plurality of mirror segments, each of which being orientable. According to a further embodiment, the laser beam guiding device can have at least one deformable mirror. With these embodiments, too, it is therefore not only possible to effect static beam shaping and/or highly flexible dynamic beam shaping of the machining laser beam, at least perpendicular to its direction of propagation. The position of the focus of the laser beam can also be adjusted parallel to its direction of propagation, in particular a modification of the focal length of the optical system of the machining apparatus, for example a zoom function.

The laser beam guiding device can have at least one element selected from a mirror that can be adjusted with at least one piezo actuator, a bimorph deformable mirror, a MEMS-based deformable mirror and a voice coil-based deformable mirror as a deformable mirror.

Furthermore, the laser beam guiding device, in particular the at least one movable surface, can be arranged and configured such that the machining laser beam is deflected at an angle of less than, equal to, or greater than 90°. This enables a flexible spatial configuration of the machining apparatus.

In further embodiments, the movement device has at least one element selected from a piezo actuator, an electric motor, a pneumatic motor, an eccentric, a device for generating an oscillating electromagnetic field, a MEMS oscillator, a voice coil, an electrostatically movable actuator, a plurality thereof and/or a combination thereof. This enables a highly variable movement and/or a high-frequency dynamic movement of the machining laser beam.

According to embodiments of the machining apparatus, the optical unit can be selected from a lens, a focusing lens, a collimation lens, another of the at least one laser beam guiding devices, an adaptive mirror, a plurality thereof and/or a combination thereof. A simple adaptive mirror can be used as the adaptive mirror, which can only change the focal length, for example by means of its radius of curvature. The optical unit can be displaceable parallel to the direction of propagation, for example if it is configured as a transmissive optical element. Alternatively, the optical unit can be stationary, for example if it is configured as a reflective optical element whose reflective surface is movable. This allows the focal length of the optical system to be varied.

In addition, the at least one optical unit can be arranged in the direction of propagation in front of and/or behind the laser beam guiding device. For example, the focusing lens can be arranged in the direction of propagation behind the laser beam guiding device and/or the collimation lens can be arranged in the direction of propagation in front of the laser beam guiding device.

In the machining apparatus, the interface can be connected or provided with a machining laser source for generating a machining laser beam. The machining laser source can provide a laser power of at least 1 kW, preferably at least 4 kW, more preferably between 1 to 30 kW, most preferably between 1 to 25 kW. Furthermore, a control unit for controlling the optical unit and/or the laser beam guiding device, in particular the movement device, can be provided in the machining apparatus.

According to embodiments of the machining apparatus, the at least one movable surface can be adjustable with a frequency between 10 Hz and 15 kHz, preferably between 100 Hz and 10 kHz. As a result, a high-frequency dynamic movement of the surface and thereby a high-frequency dynamic movement of the machining laser beam, for example beam oscillation or focal point oscillation of the machining laser beam, can be generated. Furthermore, the at least one movable surface can be adjustable in such a way that it dynamically moves the machining laser beam at least perpendicular to the direction of propagation. The at least one movable surface can be adjustable in such a way that it dynamically moves the machining laser beam and generates at least one focal point oscillation with at least one oscillation amplitude and at least one oscillation frequency and with a focal point oscillation path that corresponds to a two- or three-dimensional Lissajous figure or a combination of two- or three-dimensional Lissajous figures.

A further embodiment provides a use of a machining apparatus according to any one of the preceding embodiments for laser machining a workpiece, in particular for laser cutting.

Another embodiment relates to a method for laser machining a workpiece with a machining apparatus according to any one of the preceding embodiments, in particular for laser cutting, comprising: Irradiating a machining zone of a workpiece with a machining laser beam from a machining laser source which is provided at the interface of the machining apparatus through the outlet opening of the machining apparatus; and modifying the focal length of the optical system and the beam parameter product of the machining laser beam integrated over time by means of the laser beam guiding device, which has at least one movable surface.

In the method, the laser beam guiding device, in particular the at least one movable surface, can dynamically move the machining laser beam at least perpendicular to the direction of propagation in order to modify the beam parameter product. This enables a focal point oscillation to be generated. Furthermore, in order to modify the beam parameter product, the laser beam guiding device, in particular the at least one movable surface, can dynamically move the machining laser beam to modify the beam parameter product and generate at least one focal point oscillation with at least one oscillation amplitude and at least one oscillation frequency and with a focal point oscillation path that corresponds to a two- or three-dimensional Lissajous figure or a combination of two- or three-dimensional Lissajous figures.

With the method for laser machining a workpiece of the above embodiments, the same advantages, operating modes and functions can be realised as with the embodiments of the machining apparatus for laser machining a workpiece, in particular with identical and/or analogous features.

BRIEF DESCRIPTION OF THE SEVERAL VIEWS OF THE DRAWINGS

All non-mutually exclusive features of embodiments described here can be combined with one another. The same elements of the embodiments are given the same reference signs in the following description. Individual or a plurality of elements of one embodiment can be used in the other embodiments without further mention. Embodiments of the invention are now described in more detail using the following examples with reference to figures, without intending any limitation thereby. In the figures.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

The machining apparatus according to the embodiments of the invention are described below, inter alia, by way of examples with a machining head, without limiting the invention thereto. The machining apparatus and the method according to the embodiments of the invention can also be realised without a machining head.

Furthermore, where value ranges are described here, the specification of a broad range with narrower alternative or preferred ranges is also considered to disclose ranges that may be formed by any combination of specified lower range limits and specified upper range limits.

The term "integrated over time" or "averaged over time" means integrated or averaged over a period of time or a time period. In connection with a focal point oscillation, this means integrated or averaged over at least one oscillation period, integrated or averaged in connection with beam oscillation over at least one oscillation period.

The terms "dynamic movement" of the laser beam or "dynamically moving" laser beam and variants thereof mean that the laser beam is moved at high frequency, for example at frequencies from 10 Hz to 15 kHz. The same applies analogously to "dynamically" movable, orientable and/or adjustable elements of the machining apparatus.

Figure 1:
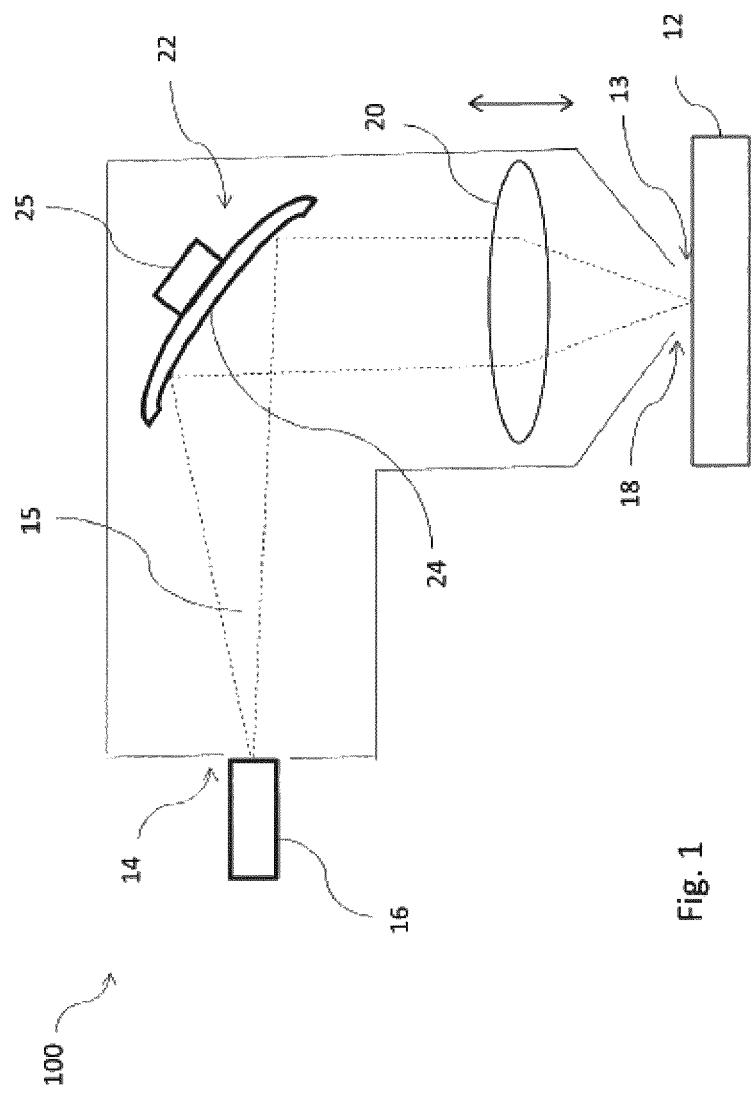
FIG. 1 schematically shows a machining apparatus 100 for laser machining a workpiece as a first example according to embodiments of the invention.

FIG. 1 schematically illustrates a first example of a machining apparatus 100 according to embodiments of the invention for laser machining a workpiece 12 in a machining zone 13.

The machining apparatus 100 has a first interface 14 for a machining laser source 16 for generating a machining laser beam 15, which is shown in FIG. 1 with dashed lines as one beam. In the present example, the machining apparatus 100 is configured as a machining head, and a transport fibre of the machining laser source 16 is provided at the first interface 14 for coupling the machining laser source. In alternative examples, the machining laser source 16 can be provided directly at the interface 14. In the present examples, the machining laser source 16 has a power of about 6 kW and generates the machining laser beam in a spectral range which includes a wavelength of 1070 nm. However, machining laser sources with a power lower than 6 kW, for example approx. 1 kW, or with a power greater than 6 kW can also be used.

The machining apparatus 100 has an outlet opening 18 for the machining laser beam 15.

An optical system with an optical unit 20 and a stationary laser beam guiding device 22 is located within the machining apparatus 100.

In the present example, the optical unit 20 is transmissive and is arranged in the region between the laser beam guiding device 22 and the outlet opening 18. The optical unit 20 is configured as a focusing lens which can be displaced parallel to the direction of propagation of the machining laser beam 15, as illustrated by the double arrow in FIG. 1. By moving the focusing lens, the focal length of the optical system can be adjusted with the optical unit 20.

The laser beam guiding device 22 is arranged in a fixed position in the area between the first interface 14 and the optical unit 20. In the present example, the laser beam guiding device 22 has a surface 24 reflecting the machining laser beam 15. The reflective surface 24 is arranged and aligned in such a way that it deflects the machining beam 15 to the optical unit 20. The reflective surface 24 is at least partially dynamically movable by means of at least one movement device 25.

The laser beam guiding device 22 has a substantially circular segment mirror with a diameter of approx. 50 mm as a reflective surface with 41 mirror segments separated from one another and arranged next to one another, which form a concentric pattern. Each mirror segment has a gold coating, is reflective for the machining laser beam 15 and can be individually dynamically oriented by means of a piezo actuator of the movement device 25. The piezo actuators are arranged according to the pattern of the mirror segments. In the present example, these are piezo actuators based on a modified PZT ceramic with a typical operating voltage of 120 V. The laser beam guiding device 22 thus provides a segmented total surface reflecting the machining laser beam 15, the surface geometry of which, in particular the curvature thereof, can be adjusted in a highly dynamic manner.

In the present example, the movement device 25 thus contains an individually controllable piezo actuator for each mirror segment. In other examples, the movement device can contain a plurality of elements selected from an electric motor, a pneumatic motor, an eccentric, a device for generating an oscillating electromagnetic field, a MEMS oscillator, a voice coil and an electrostatically movable actuator. A combination of different actuators can also be provided in the movement device 25.

The stationary laser beam guiding device 22 is therefore arranged and configured such that it deflects the machining laser beam 15 to the optical unit 20 and dynamically moves the machining laser beam 15, for example at a frequency between 10 Hz and 15 kHz. In addition, the laser beam guiding device 22 in the present example is configured such that it collimates the machining laser beam 15.

In a first application of the machining apparatus 100, the focusing lens of the optical unit 20 is moved parallel to the direction of propagation of the machining laser beam 15, if necessary, in order to preset the focal length of the optical system. The machining laser beam 15 is directed from the interface 14 onto the reflective surface 24 of the laser beam guiding device 22. The individual segments of the reflective surface 24 are moved dynamically by the piezo actuators of the movement device 25 at a frequency between 10 Hz and 15 kHz in such a way that the curvature of the surface 24 is adjusted in a highly dynamic manner. This can be done continuously over one or more time periods. Due to the movement of the segments, the machining laser beam 15 reflected thereon is moved dynamically at least perpendicular to its direction of propagation and deflected in the direction of the focusing lens of the optical unit 20. A highly flexible beam shaping of the machining laser beam 15 is thus carried out at least perpendicular to its direction of propagation. This creates a focal point oscillation. In an exemplary operation, a focal point oscillation is generated with at least one oscillation amplitude and at least one oscillation frequency and with a focal point oscillation path, which corresponds to a two- or three-dimensional Lissajous figure or a combination of two- or three-dimensional Lissajous figures.

At the same time, the machining laser beam 15 is collimated by varying the curvature of the surface 24. In this way, the focal length of the optical system set by means of the optical unit 20 is modified. The machining laser beam 15 is deflected onto the focusing lens of the optical unit 20, focused and directed in the direction of the outlet opening 18. The dynamically moving machining laser beam 15 exits through the outlet opening 18 and strikes the machining zone 13 of the workpiece 12, i.e., at frequencies which are significantly higher than the typical reaction time between the laser beam and the material.

In the case of the exemplary operation mentioned above, any Lissajous figures are written on the workpiece 12 with the machining laser beam 15. The Lissajous figures can be stored in a database of a control unit of the machining apparatus, which controls the piezo actuators of the movement device 25 in a corresponding manner. During the dynamic movement of the machining laser beam 15, a focal point oscillation with an oscillation amplitude less than or equal to +/−5 mm with an oscillation frequency between 10 Hz and 15 kHz is generated, which corresponds to a two-dimensional Lissajous figure or a combination of two-dimensional Lissajous figures. The focal point has, for example, a diameter or a size of at least 0.1 mm. In other examples, a focal point with a diameter smaller than 0.1 mm can be provided.

Due to the movement of the individual segments of the reflective surface 24, the machining laser beam 15 is thus formed both parallel and perpendicular to its direction of propagation. In this way, the focal length of the optical system and the beam parameter product of the moving machining laser beam, integrated over time, are modified. Since the curvature of the surface 24 is continuously and dynamically changed at frequencies between 10 Hz and 15 kHz, almost any intensity distribution of the beam spot and beam parameter products of the machining laser beam 15 can be provided by means of dynamic beam shaping. The machining laser beam is moved at frequencies that are significantly higher than the typical reaction time between the laser beam and the material. In addition, the dynamic movement of the laser beam is brought about by the movable surface 24, the material of which is suitable for high-power laser beams. For this reason, the machining apparatus, even if it is configured as a machining head, can be used for powers of the machining laser up to 4 kW and above. Since the adjustment of the curvature of the surface 24 also modifies the focal length of the optical system, highly flexible fine tuning of the focal length is also made possible.

In a second application of the machining apparatus 100, in contrast to the first application, the segments of the reflective surface are not dynamically moved continuously over the course of one or more time periods. Rather, the segments and thus the curvature of the surface 24 are adjusted at one or more singular times in such a way that the machining laser beam 15 is collimated and the beam bundle is formed statically perpendicular to the direction of propagation with adjustment of the beam parameter product. In this way, a desired focal length and a desired static beam shape of the machining laser beam are set at the beginning and/or at individually desired times in the course of the laser machining. Thus, in the second application, the focal length of the optical system and the beam parameter product of the non-dynamically moving machining laser beam, integrated over time, are also modified by the laser beam guiding device 22. The other advantages mentioned for the first application apply in a corresponding manner to the second application. The applications of the machining apparatus 100 of the first example can be summarised as follows:

Since the laser beam guiding device 22 is used as zoom optics as described above, the machining laser beam 15 is deflected by the segment mirror with the desired selectable beam divergence. The focusing lens of the optical unit 20 is brought into a selectable adequate lens position by displacement, such that the focus of the machining laser beam comes to lie in the machining zone 13. The more divergent the laser beam is deflected by the segment mirror, the smaller the beam focus diameter on the workpiece 12.

If the laser beam guiding device 22 is used simultaneously with the zoom function as static beam shaping optics, the surface 24 of the segment mirror assumes an adequately controllable surface curvature depending on the desired aberration. The more actuators operate the segment mirror, the more arbitrarily the surface may be. Here too, the correct position of the focusing lens ensures that the focal point (focus) of the machining laser beam 15 comes to rest on the workpiece 12.

If the laser beam guiding device 22 is used simultaneously with the zoom function for dynamic beam shaping, the surface 24 of the segment mirror is changed with a sufficiently high frequency above 10 Hz, in particular above 100 Hz, such that the resulting focus on the workpiece 12 performs the desired movement at least lateral to the laser beam propagation. Such movements can be configured as desired, for example, all possible Lissajous figures can be written on the workpiece, and the beam parameter product of the machining laser beam integrated over time is modified. Here too, the correct position of the focusing lens of the optical unit 20 ensures that the focal point of the machining laser beam comes to rest on the workpiece 12 with the beam parameter product modified by the dynamic beam shaping.

In the first application, as well as in the second application, an operating mode is implemented as described above, in which the focal length of the optical system and the beam parameter product of the machining laser beam integrated over time are modified by the adjustment of the segments of the reflective surface. In additional operating modes, either the focal length of the optical system or only the beam parameter product of the machining laser beam integrated over time is modified by the adjustment of the mirror segments in the first and/or second application. In a further additional operating mode, the segments are adjusted such that the machining beam is deflected without modification of the focal length of the optical system and the beam parameter product.

In a modification of the first example, the laser beam guiding device 22 has a deformable mirror (DM, dynamic mirror) in order to provide a movable, reflective, continuous surface 24. The mirror is formed by a membrane made of deformable material, which is dynamically deformable by means of the movement unit 25. In the present example, the membrane is circular with a diameter of approximately 45 mm. The movement unit 25 consists of individually controllable piezo actuators distributed uniformly on the underside of the membrane in a circular pattern. This example concerns piezo actuators based on a modified PZT (lead zirconate titanate) ceramic with a typical operating voltage of 120 V. In the present example, 32 piezo actuators are provided in the movement unit 25, with which 32 individual flat areas of the membrane can be individually adjusted. The top of the membrane is covered with a highly reflective multi-layer dielectric coating containing copper. The deformable, reflective and continuous surface thus provided is suitable for laser beams up to 120 kW at a wavelength of 1060 to 1090 nm.

Alternatively, a bimorph deformable mirror, a MEMS (micro-electromechanical system) oscillator-based or MOEMS (micro-opto-electromechanical system) oscillator-based deformable mirror or a voice coil-based deformable mirror can be provided as the deformable mirror. The bimorph deformable mirror has, for example, a thin glass plate which is connected to a piezoceramic plate consisting of two differently polarized piezo layers. At the corners, the plates are held in such a way that they have resonance properties. The connection between the glass and the piezo plate contains an electrically conductive electrode and the back of the piezo plate is provided with individual control electrodes. In operation, voltages are applied to the control electrodes which generate sideways forces in the piezo plate, causing the mirror to bend. In the case of the mirror deformable on the basis of MEMS or MOEMS, for example, a continuous, movable electrode which is flat in the non-deformed state and which is reflective for it on its surface exposed to the machining laser beam 15, is moved by means of actuators of a further flat electrode arranged in parallel via electrostatic forces. In the case of the mirror which is deformable on the basis of a voice coil, voice coils are used as actuators which connect a thick base platform to a relatively thin and deformable glass plate. There is a reference plate in the holes between the glass plate and the base platform. The coil actuators are provided therein. A magnetic alternating field created by current flow deflects the coil actuators. These move the glass plate attached to it.

The movable, reflective, continuous surface 24 of the deformable mirror (DM, dynamic mirror) of the modification explained above can be operated in the same way as the previously described segment mirror of the first example. The modification of the first example thus also enables both static and dynamic movement and shaping of the machining laser beam and adjustment of the focal length of the optical system. Therefore, the same applications and operating modes as explained for the first example can be performed in the same way and the same advantages can be achieved. In particular, the focal length of the optical system and the beam parameter product of the machining laser beam integrated over time can be modified by means of the laser beam guiding device 22.

Figure 2:
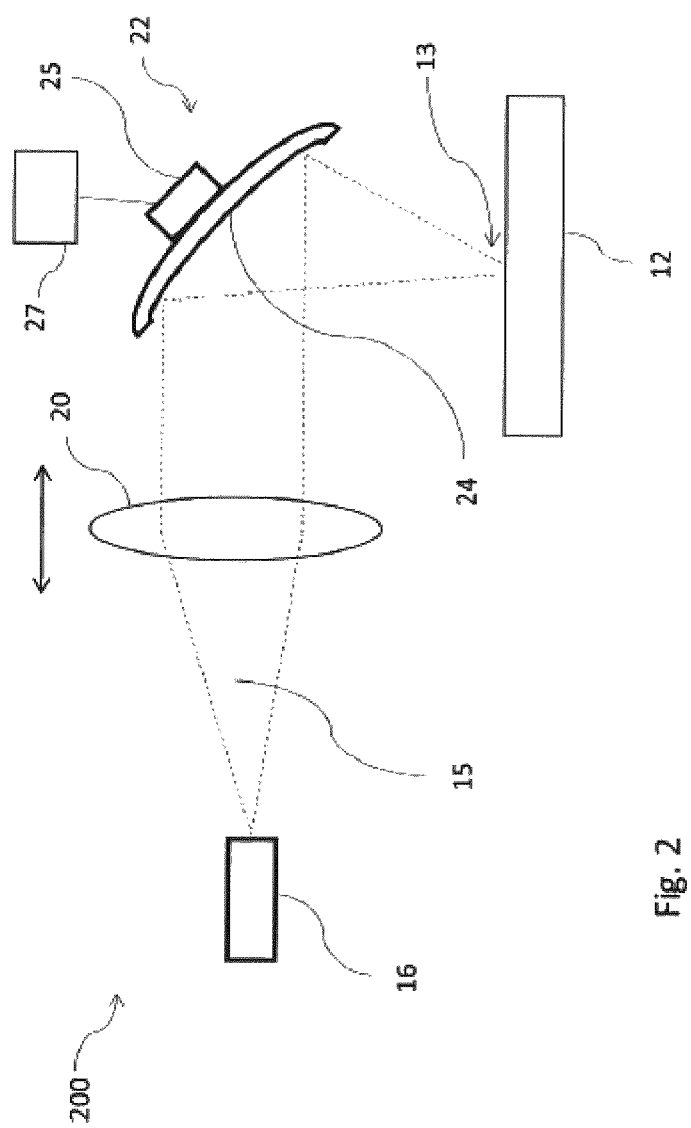
FIG. 2 schematically shows a machining apparatus 200 for laser machining a workpiece as a second example according to embodiments of the invention.

FIG. 2 shows an exemplary modification of the machining apparatus of FIG. 1. The differences in the relevant description of the figures are therefore explained, for example in FIG. 1. The housing with the interface 14 and the outlet opening 18 is not shown in FIG. 2.

FIG. 2 schematically illustrates a machining apparatus 200 for laser machining a workpiece as a second example according to embodiments of the invention. In the example in FIG. 2, the optical unit 20 for the machining laser beam 15 is transmissive and is arranged in the area between the interface 14 and the laser beam guiding device 22. The optical unit 20 is configured as a collimation lens which can be displaced in the direction of propagation of the machining laser beam 15, as indicated by the double arrow in FIG. 2. By moving the collimation lens, the focal length of the optical system can be adjusted with the optical unit 20. The curvature of the movable surface 24 of the segment mirror of the laser beam guiding device 22 can also be adjusted such that the focus of the machining laser beam 15 is displaced parallel to the direction of propagation. Here, the laser beam guiding device 22 takes on a focusing function.

The further features, the functions and the advantages of the second example according to FIG. 2 correspond to those of the example of FIG. 1. The modification of the first example explained above, in which the deformable mirror with a movable reflecting continuous surface is provided instead of the segment mirror, can also be implemented in the same way for the second example. In operation, depending on the position of the collimation lens of the optical device 20, the magnification of the machining laser beam 15 imaged on the workpiece is different. With its arbitrarily selectable and/or variable curvature of the movable surface, the segment mirror or the deformable mirror of the laser beam guiding device 22 causes the machining laser beam 15 to be focused in one operating mode and to be focused on the workpiece 12, and in addition the static or dynamic beam shaping is performed. The additional operating modes described above can also be implemented in the same way.

FIG. 2 also illustrates that the movement device 25 can be connected to a control unit 27 in a wired or wireless data-conducting manner in order to control the movement device 25. For example, 27 Lissajous figures can be stored in a database of the control unit, and the control unit can control the movement device or the individual actuators accordingly. Such a control unit 27 can also be provided in the machining apparatus 100, 300 and 400 of FIGS. 1, 3 and 4 and in their modifications and variants.

Figure 3:
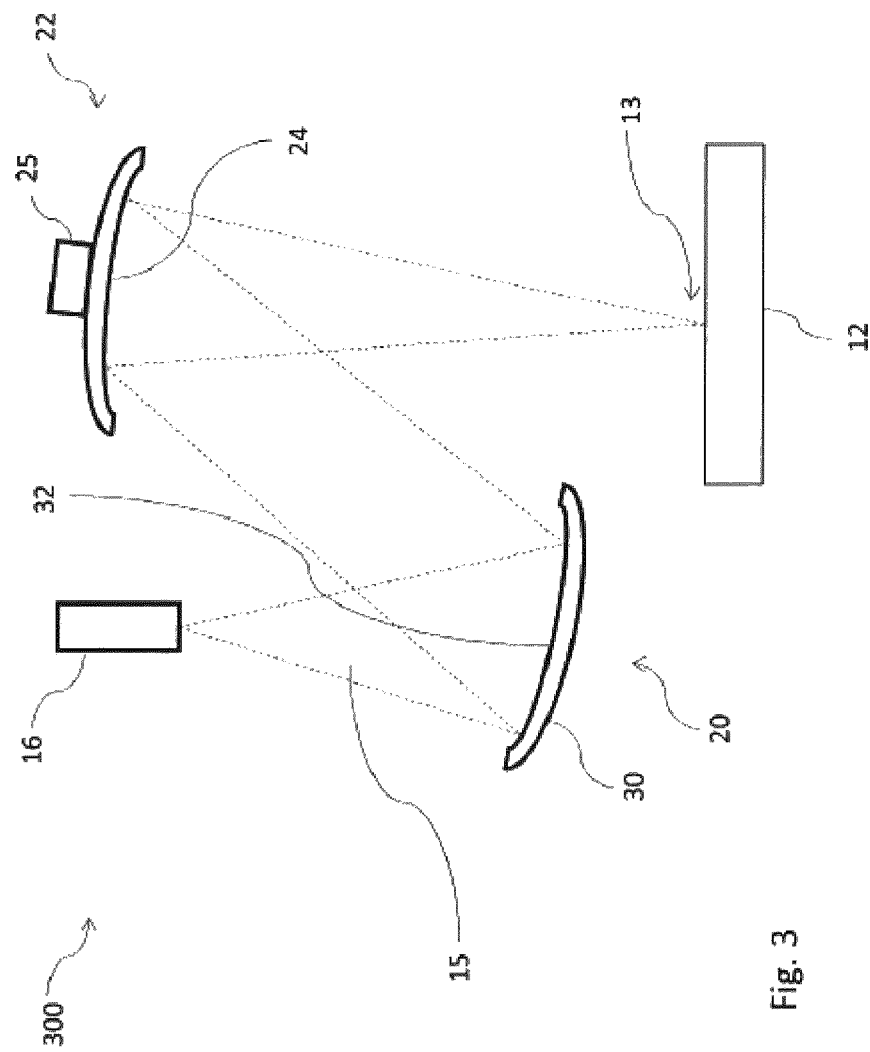
FIG. 3 schematically shows a machining apparatus 300 for laser machining a workpiece as a third example according to embodiments of the invention.

FIG. 3 schematically illustrates a machining apparatus 300 for laser machining a workpiece as a third example according to embodiments of the invention. FIG. 3 shows an exemplary modification of the machining apparatus of FIG. 2. The differences in the relevant description of the figures are therefore explained, for example in FIG. 2. The housing with the interface 14 and the outlet opening 18 is not shown in FIG. 3.

In contrast to the example in FIG. 2, in the machining apparatus 300 the optical unit 20 is configured to be reflective. Instead of the collimation lens 20, a fixed, simple adaptive mirror 30 is provided, the reflective surface of which is movable and adjustable in such a way that its radius of curvature is changed. As a result, the beam path of the machining beam 15 is changed as shown in FIG. 3. The machining apparatus 300 is thus configured in such a way that the machining laser beam 15 is reflected at least twice and deflected at least twice until it strikes the workpiece 12. In the present example, the simple adaptive mirror 30 is a high-power laser mirror, the reflecting movable surface 32 of which is configured as a membrane, which can be deformed in a controlled manner by changing the pressure in a fluid on the back of the membrane. The reflective surface 32 of the simple adaptive mirror 30 is not dynamic and/or cannot be moved or deformed at high frequency. In operation, the machining laser beam 15 is collimated and deflected onto the laser beam guiding device 22 during the deflection at the mirror 30. The latter forms the machining laser beam 15 statically or dynamically and focuses it on the workpiece 12. This exemplary embodiment has the advantage that there are no optics that are movable and moved parallel to the direction of propagation of the machining laser beam 15. Only the mirrors are deformed in a corresponding manner for a change in focus.

Figure 4:
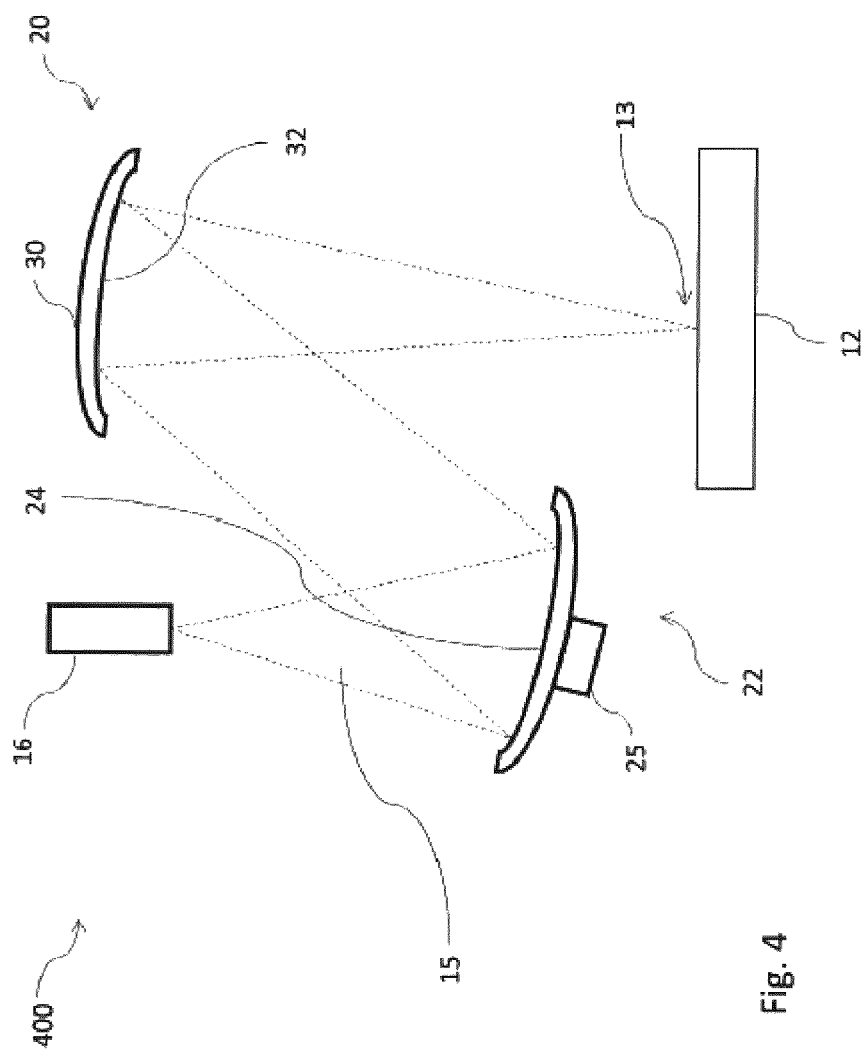
FIG. 4 schematically shows a machining apparatus 400 for laser machining a workpiece as a fourth example according to embodiments of the invention.

FIG. 4 schematically illustrates a machining apparatus 400 for laser machining a workpiece as a fourth example according to embodiments of the invention. FIG. 4 shows an exemplary modification of the machining apparatus of FIG. 1. The differences in the relevant description of the figures are therefore explained, for example in FIG. 1. The housing with the interface 14 and the outlet opening 18 is not shown in FIG. 4.

In contrast to the example in FIG. 1, in the machining apparatus 400 the optical unit 20 is configured to be reflective. Starting from the machining apparatus 100 of FIG. 1, instead of the focusing lens 20, the stationary, simple, adaptive mirror 30 described above is provided in the machining apparatus 400. The beam path of the machining laser beam 15 is configured such that the machining laser beam 15 reflects at least twice and is deflected at least twice in the process. In operation, the machining laser beam 15 first strikes the laser beam guiding device 22 and is collimated by it and shaped statically or dynamically. At the same time, the machining laser beam 15 is deflected by the laser beam guiding device 22 onto the adaptive mirror 30. There, the machining laser beam 15 is focused and deflected onto the workpiece 12. In this example too, no optics that are movable and moved parallel to the direction of propagation of the machining laser beam 15 are provided. Only the mirrors for a change in focus are deformed accordingly.

In the above examples explained with reference to FIGS. 3 and 4, a further laser beam guiding device 22 can be provided instead of the simple adaptive mirror 30. The additional operating modes described above can also be implemented with the examples of FIGS. 3 and 4.

In all examples and embodiments, additional transmissive optical elements (for example lenses) and/or additional reflective optical elements (for example plane mirrors) can be provided in the optical system, for example for deflecting the machining laser beam 15.

All of the embodiments of the machining apparatus allow a modification of the beam parameter product of the machining laser beam 15 and a modification of the focal length of the optical system with a single component, namely with the laser beam guiding device 22. The beam parameter product is modified with static or dynamic beam shaping of the machining laser beam 15, as a result of which advantageous intensity distributions and power distributions of its beam spot can be provided.

With the machining apparatus of the examples and embodiments, an operating mode is implemented in which the focal length of the optical system and the beam parameter product of the machining laser beam are changed. For this purpose, the at least one movable surface can be adjusted in such a way that it modifies the focal length of the optical system and the beam parameter product of the machining laser beam integrated over time. In additional operating modes of examples and embodiments of the machining apparatus, the at least one movable surface can be adjusted in such a way that it modifies the focal length of the optical system or the beam parameter product of the machining laser beam integrated over time. For a further additional operating mode, the at least one movable surface can be adjusted in such a way that it does not modify the focal length or the beam parameter product of the machining laser beam integrated over time.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

It is particularly obvious to a person skilled in the art that the invention can be used not only for laser machining systems, but also for other devices comprising lasers. Furthermore, the components of the machining apparatus for laser machining workpieces can be produced so as to be distributed over several physical products.

The invention claimed is:

1. A machining apparatus for at least one of laser machining and laser cutting a workpiece in a machining zone, comprising:
   a laser machining head comprising an interface configured for a machining laser source configured to generate a machining laser beam with a direction of propagation;
   an outlet opening for the machining laser beam; and
   an optical system between the interface and the outlet opening, the optical system comprising:
      at least one optical unit configured to adjust a focal length of the optical system; and
      at least one stationary laser beam guiding device comprising at least one movable surface,
   wherein the at least one movable surface is configured to be movable by at least one movement device such that the focal length of the optical system and a beam parameter product of the machining laser beam integrated over time in at least one operating mode are modified; and
   wherein the at least one movable surface comprises at least one of a plurality of dynamically orientable surfaces and a continuous surface configured to be dynamically deformed.

2. The machining apparatus according to claim 1, wherein:
   the at least one movable surface comprises a surface unit of the at least one stationary laser beam guiding device, the surface unit comprising at least one of an adjustable surface geometry and an adjustable surface curvature; and
   wherein the at least one movable surface is configured to be dynamically adjustable.

3. The machining apparatus according to claim 1, wherein:
   the at least one stationary laser beam guiding device comprises at least one segment mirror with a plurality of mirror segments each of which are configured to be oriented; and
   the at least one stationary laser beam guiding device has at least one deformable mirror.

4. The machining apparatus according to claim 1, wherein the at least one stationary laser beam guiding device comprises at least one of: a mirror configured to be adjusted with at least one piezo actuator, a bimorph deformable mirror, a MEMS-based deformable mirror and a voice coil-based deformable mirror.

5. The machining apparatus according claim 1, wherein:
   at least one of the at least one stationary laser beam guiding device and the at least one movable surface, is arranged and configured such that the machining laser beam is deflected at an angle less than 90'; or
   the at least one of the at least one stationary laser beam guiding device is arranged and configured such that the machining laser beam is deflected at an angle equal to 90'; or
   the at least one of the at least one stationary laser beam guiding device and the at least one movable surface, is arranged and configured such that the machining laser beam is deflected at an angle greater than 90°.

6. The machining apparatus according to claim 2, wherein the movement device has at least one element selected from a piezo actuator, an electric motor, a pneumatic motor, an eccentric, a device for generating an oscillating electromagnetic field, a MEMS oscillator, a voice coil, and an electrostatically movable actuator.

7. The machining apparatus according to claim 1, wherein the optical unit is at least one element selected from a lens, a focusing lens, a collimation lens, another of the at least one of the at least one stationary laser beam guiding devices, and an adaptive mirror.

8. The machining apparatus according to claim 1, wherein:
   the optical unit can be displaced parallel to the direction of propagation or is stationary; and
   the optical unit is arranged in front of or behind the at least one stationary laser beam guiding device in the direction of propagation.

9. The machining apparatus according to claim 7, wherein:
   the focusing lens is arranged in the direction of propagation behind the at least one stationary laser beam guiding device; and
   the collimation lens is arranged in the direction of propagation in front of the at least one stationary laser beam guiding device.

10. The machining apparatus according to claim 1, wherein:
    the interface is connected to or provided with the machining laser source configured to generate the machining laser beam; and
    a control unit is configured and arranged to control at least one of the optical unit, the at least one stationary laser beam laser beam guiding device, and the movement device.

11. The machining apparatus according to claim 1, wherein the machining laser source provides a laser power of at least one of at least 1 kW, at least 4 kW, between 1 to 30 kW, and between 1 to 25 kW.

12. The machining apparatus according to claim 1, wherein:
    the at least one movable surface is configured to be adjusted with a frequency of at least one of between 10 Hz and 15 kHz and between 100 Hz and 10 kHz;
    the at least one movable surface is configured to be adjusted by means of the at least one movement device such that the at least one movement device moves the machining laser beam at least perpendicular to the direction of propagation; and
    the at least one movable surface is configured to be adjusted by means of the at least one movement device such that the at least on movement device moves the machining laser beam dynamically and generates at least one focal point oscillation with at least one oscillation amplitude and at least one oscillation frequency and with a focal point oscillation path that corresponds to a two- or three-dimensional Lissajous figure or a combination of two- or three-dimensional Lissajous figures.

13. A use of the machining apparatus according to claim 1 for at least one of laser machining of the workpiece and laser cutting of the workpiece.

14. A method for at least one of laser machining the workpiece and laser cutting a workpiece with a machining apparatus according to claim 1, the method comprising the steps of:
  irradiating the machining zone of the workpiece with a machining laser beam from the machining laser source which is provided at the interface of the machining apparatus through the outlet opening of the machining apparatus; and
  modifying a focal length of the optical system and the beam parameter product of the machining laser beam integrated over time by means of the at least one stationary laser beam guiding device which has the at least one movable surface.

15. The method according to claim 14, wherein:
  at least one of the at least one stationary laser beam guiding device and the at least one movable surface, is configured and arranged to dynamically move the machining laser beam at least perpendicular to the direction of propagation in order to modify the beam parameter product; and
  wherein the at least one of the at least one stationary laser beam guiding device and the at least one movable surface, is configured and arranged to dynamically move the machining laser beam to modify the beam parameter product and generate at least one focal point oscillation with at least one oscillation amplitude and at least one oscillation frequency and with a focal point oscillation path that corresponds to a two- or three-dimensional Lissajous figure or a combination of two- or three-dimensional Lissajous figures.

16. The machining apparatus according to claim 1, wherein:
  the at least one movable surface comprises a surface unit of the at least one stationary laser beam guiding device, the surface unit comprising at least one of an adjustable surface geometry and an adjustable surface curvature; or
  the at least one movable surface is configured to be dynamically adjustable.

17. The machining apparatus according to claim 1, wherein:
  the at least one stationary laser beam guiding device comprises at least one segment mirror with a plurality of mirror segments each of which are configured to be oriented; or
  the at least one stationary laser beam guiding device has at least one deformable mirror.

18. The machining apparatus according to claim 1, wherein:
  the optical unit can be displaced parallel to the direction of propagation or is stationary; or
  the optical unit is arranged in front of or behind the at least one stationary laser beam guiding device in the direction of propagation.

19. The machining apparatus according to claim 8, wherein:
  the focusing lens is arranged in the direction of propagation behind the at least one stationary laser beam guiding device; or
  the collimation lens is arranged in the direction of propagation in front of the at least one stationary laser beam guiding device.

20. The machining apparatus according to claim 1, wherein:
  the interface is connected to or provided with a machining laser source configured to generate the machining laser beam; or
  a control unit is configured and arranged to control at least one of the optical unit, the at least one stationary laser beam guiding device, and the movement device.

21. The method according to claim 14, wherein:
  at least one of the at least one stationary laser beam guiding device and the at least one movable surface, is configured and arranged to dynamically move the machining laser beam at least perpendicular to the direction of propagation in order to modify the beam parameter product; or
  at least one of the at least one stationary laser beam guiding device and the at least one movable surface, is configured and arranged to dynamically move the machining laser beam to modify the beam parameter product and generate at least one focal point oscillation with at least one oscillation amplitude and at least one oscillation frequency and with a focal point oscillation path that corresponds to a two- or three-dimensional Lissajous figure or a combination of two- or three-dimensional Lissajous figures.

* * * * *